US010457218B2

(12) United States Patent
Castro Mercado et al.

(10) Patent No.: US 10,457,218 B2
(45) Date of Patent: Oct. 29, 2019

(54) CARGO FLOOR SYSTEM INCLUDING A RETRACTABLE FLOOR ASSEMBLY

(71) Applicant: FORD GLOBAL TECHNOLOGIES, LLC, Dearborn, MI (US)

(72) Inventors: Sergio Irving Castro Mercado, Cuernavaca (MX); Emmanuel Garcia Ruiz, Santa Ursula Xitla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/247,028

(22) Filed: Aug. 25, 2016

(65) Prior Publication Data

US 2018/0056881 A1 Mar. 1, 2018

(51) Int. Cl.
*B62D 43/06* (2006.01)
*B60R 5/04* (2006.01)
*B62D 43/10* (2006.01)

(52) U.S. Cl.
CPC .............. *B60R 5/047* (2013.01); *B62D 43/06* (2013.01); *B62D 43/10* (2013.01)

(58) Field of Classification Search
CPC ......... B60R 5/047; B60R 5/048; B60R 13/01; B60R 13/013; B60R 13/011; B62D 43/10
See application file for complete search history.

(56) References Cited

U.S. PATENT DOCUMENTS

| | | | | |
|---|---|---|---|---|
| 2,911,253 A | * | 11/1959 | Dewey | B60R 13/01 296/39.1 |
| 3,476,432 A | * | 11/1969 | Phillips | B60N 3/001 296/156 |
| 4,029,834 A | | 6/1977 | Bartlett | |
| 4,279,439 A | | 7/1981 | Cantieri | |
| 4,351,555 A | * | 9/1982 | Hashimoto | B60R 5/044 16/366 |
| 4,568,587 A | * | 2/1986 | Balzer | A47L 23/26 428/192 |
| 4,784,427 A | * | 11/1988 | Burgess | B60J 7/068 160/314 |
| 4,801,169 A | * | 1/1989 | Queen | B60R 13/01 296/39.1 |
| 4,877,672 A | * | 10/1989 | Shreiner | A47L 23/26 428/156 |
| 4,889,381 A | * | 12/1989 | Tamblyn | B60J 7/068 296/98 |
| 4,969,793 A | * | 11/1990 | Pawl | B60R 5/04 187/269 |

(Continued)

FOREIGN PATENT DOCUMENTS

DE 3806506 A1 10/1988

OTHER PUBLICATIONS

English Machine Translation of DE3806506A1.

*Primary Examiner* — Emma K Frick
(74) *Attorney, Agent, or Firm* — Vichit Chea; King & Schickli, PLLC

(57) ABSTRACT

A cargo floor system includes a floor pan and a retractable floor assembly. The floor pan includes a recessed storage compartment and an access opening in communication with the recessed storage compartment. The retractable floor assembly includes a retractable floor spanning the access opening and a drive mechanism displacing the retractable floor between a deployed position closing the access opening and a stowed position opening the access opening.

17 Claims, 6 Drawing Sheets

(56) References Cited

U.S. PATENT DOCUMENTS

| | | | | |
|---|---|---|---|---|
| 5,040,843 | A * | 8/1991 | Russell | B60J 7/068 160/133 |
| 5,083,831 | A * | 1/1992 | Foyen | B60N 3/044 296/39.1 |
| 5,178,434 | A * | 1/1993 | Krebs | B60N 3/04 180/271 |
| 5,251,950 | A * | 10/1993 | Bernardo | B60J 7/041 296/100.03 |
| 5,322,335 | A * | 6/1994 | Niemi | B60N 2/6009 296/39.1 |
| 5,330,246 | A * | 7/1994 | Bernardo | E06B 9/17 160/130 |
| 5,685,592 | A * | 11/1997 | Heinz | B60N 3/10 224/925 |
| 6,102,464 | A * | 8/2000 | Schneider | B62D 43/10 296/37.3 |
| 6,276,735 | B1 * | 8/2001 | Champion | B60J 7/041 296/100.06 |
| 6,290,278 | B1 * | 9/2001 | Loveland | B60R 13/01 296/37.3 |
| 6,568,732 | B2 * | 5/2003 | De Gaillard | B60R 5/047 296/24.43 |
| 6,880,875 | B2 * | 4/2005 | McClure | B62D 43/10 224/42.2 |
| 6,918,623 | B2 * | 7/2005 | Hansen | B60R 5/048 160/310 |
| 7,093,879 | B2 * | 8/2006 | Putt | B60N 3/044 224/42.2 |
| 7,182,382 | B2 * | 2/2007 | Harima | B60R 13/083 296/37.14 |
| 7,393,037 | B2 * | 7/2008 | Hwang | B60R 7/02 224/400 |
| 7,404,586 | B2 * | 7/2008 | Seiberling | B60J 7/067 296/100.09 |
| 7,730,586 | B2 * | 6/2010 | McDonald | B60R 7/04 16/326 |
| 8,474,896 | B2 | 7/2013 | Ostberg | |
| 8,808,827 | B2 * | 8/2014 | Preisler | B32B 3/12 296/39.1 |
| 8,974,157 | B2 * | 3/2015 | Jones | B60R 5/04 410/34 |
| 9,061,482 | B2 * | 6/2015 | Gold | A47G 27/0206 |
| 9,132,777 | B1 * | 9/2015 | Rodriguez | B60R 5/04 |
| 9,346,406 | B2 * | 5/2016 | Rodriguez | B60R 5/04 |
| 9,376,147 | B2 * | 6/2016 | Craven | B62D 43/06 |
| 9,863,621 | B2 * | 1/2018 | Dai | B62D 25/12 |
| 2003/0062736 | A1 * | 4/2003 | Ulert | B60R 5/047 296/24.43 |
| 2006/0192406 | A1 * | 8/2006 | Seiberling | B60J 7/061 296/98 |
| 2012/0267057 | A1 * | 10/2012 | Rydberg | B60J 5/125 160/113 |
| 2013/0255176 | A1 * | 10/2013 | Roberts | E04C 1/40 52/582.1 |
| 2017/0259745 | A1 * | 9/2017 | Schaefer | B60R 5/044 |
| 2018/0244214 | A1 * | 8/2018 | Getta | B60R 13/013 |

* cited by examiner

CARGO FLOOR SYSTEM INCLUDING A RETRACTABLE FLOOR ASSEMBLY

TECHNICAL FIELD

This document relates generally to cargo floor systems and, more particularly, to a cargo floor system for a motor vehicle including a retractable floor assembly. Such a retractable floor assembly allows easy access to a recessed storage compartment which may hold, for example, a spare wheel and tire.

BACKGROUND

This document relates to a retractable floor assembly and to a cargo floor system incorporating that retractable floor assembly. Advantageously, the retractable floor assembly allows one to more easily and conveniently access a recessed storage compartment in a floor pan of a motor vehicle thereby enabling one to more easily remove and use objects stored in the recessed storage compartment including, for example, a spare wheel and tire.

SUMMARY

In accordance with the purposes and benefits described herein, a retractable floor assembly is provided. That retractable floor assembly comprises a retractable floor including a plurality of bars connected together by a plurality of hinges and a drive mechanism for displacing the retractable floor between a stowed position and a deployed position.

The retractable floor assembly may further include a decorative cover layer carried on the plurality of bars. In at least one of many possible embodiments, the plurality of bars are made from bamboo and the decorative cover layer is a carpeting material.

The retractable floor assembly may further include a housing that holds the retractable floor when the retractable floor is in the stowed position. Further, the retractable floor may include a guide track for supporting the retractable floor as it is displaced between the stowed position and the deployed position. That guide track may include a first guide rail and a second guide rail and the retractable floor may include a first end sliding on the first guide rail and a second end sliding on the second guide rail.

In addition, the retractable floor assembly may include a drive mechanism including a drive motor and a linkage connecting the drive motor to a proximal end of the retractable floor. That linkage may include a roller upon which the retractable floor is wound.

In accordance with another aspect, a cargo floor system is provided. That cargo floor system comprises a floor pan including a recessed storage compartment and an access opening in communication with the recessed storage compartment. The cargo floor system further comprises a retractable floor assembly. That retractable floor assembly includes a retractable floor spanning the access opening and a drive mechanism displacing the retractable floor between a deployed position closing the access opening and a stowed position opening the access opening.

The retractable floor may include a plurality of bars connected together by a plurality of hinges. Further, a decorative cover layer may be carried on the plurality of bars. That decorative cover layer may also be provided on the floor pan.

Still further, the cargo floor system may further include a housing holding the retractable floor when the retractable floor is in the stowed position. In addition, the cargo system may include a guide track for receiving and supporting the retractable floor as the retractable floor is displaced between the stowed position and the deployed position. That guide track may include a first guide rail at a first side of the access opening and a second guide rail at a second side of the access opening. The retractable floor may include a first end sliding in the first guide rail and a second end sliding in the second guide rail.

The cargo floor system may also include a drive mechanism. That drive mechanism may include a drive motor and a linkage connecting the drive motor to a proximal end of the retractable floor. In one of many possible embodiments, that linkage may include a roller upon which the retractable floor is wound.

The cargo floor system may further include a spare wheel and tire held in the recessed storage compartment. Further, the decorative cover layer may also be provided on the housing. In one of many possible embodiments, the plurality of bars may be made from bamboo and the decorative cover layer may be a carpeting material.

In the following description, there are shown and described several preferred embodiments of the retractable floor assembly and the cargo floor system incorporating the retractable floor assembly. As it should be realized, the retractable floor assembly and the cargo floor system are capable of other, different embodiments and their several details are capable of modification in various, obvious aspects all without departing from the retractable floor assembly and cargo floor system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the retractable floor assembly and the cargo floor system and together with the description serve to explain certain principles thereof. In the drawing figures.

Figure 1:
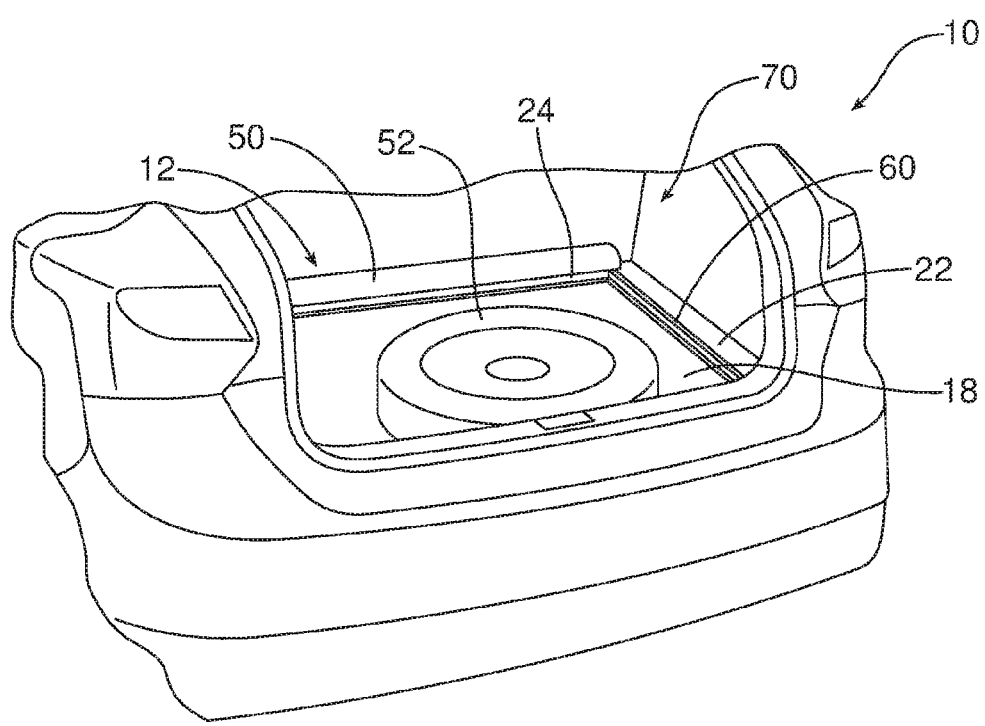
FIG. 1 is a perspective view of a motor vehicle incorporating the cargo floor system with the retractable floor assembly illustrated in the stowed position.

Reference will now be made in detail to the present preferred embodiments of the retractable floor assembly and cargo floor system, examples of which are illustrated in the accompanying drawing figures.

DETAILED DESCRIPTION

Reference is now made to FIGS. 1-6b illustrating a motor vehicle 10 equipped with the cargo floor system 12 that incorporates a floor pan 14 and a retractable floor assembly 16.

More specifically, in the illustrated embodiment the floor pan 14 includes a recessed storage compartment 18 and an access opening 20 in communication with that recessed storage compartment. The floor pan 14 may be constructed from sheet metal or other appropriate material. A decorative cover layer 22 of carpeting or other appropriate material may be provided on the floor pan 14.

Figure 4:
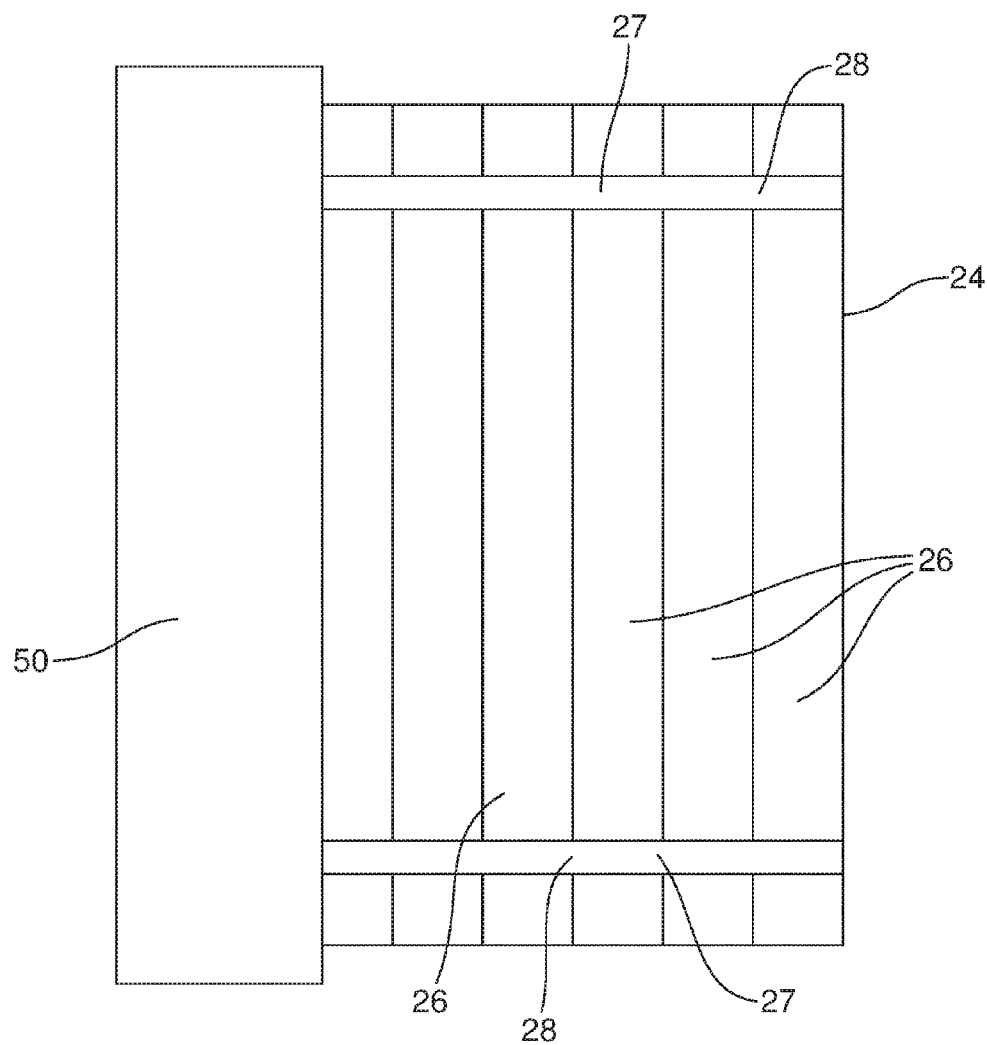
FIG. 4 is a schematic bottom plan view of the retractable floor assembly illustrating a plurality of bars and two straps that define a plurality of hinges that connect those plurality of bars together.

The retractable floor assembly 16 includes a retractable floor 24 which comprises a plurality of bars 26 connected together by two straps 27 which define a plurality of hinges 28: one hinge between two adjacent bars (see FIG. 4). In one possible embodiment, the bars 26 are made from bamboo which is both strong and lightweight. It should be appreciated, however, that the bars 26 may be made from other appropriate material if desired. The retractable floor 24 may also include a decorative cover layer 30 carried on top of the plurality of bars 26. That decorative cover layer 30 may comprise a carpeting material which matches the carpeting material layer 22 on the floor pan 14.

Figure 5:
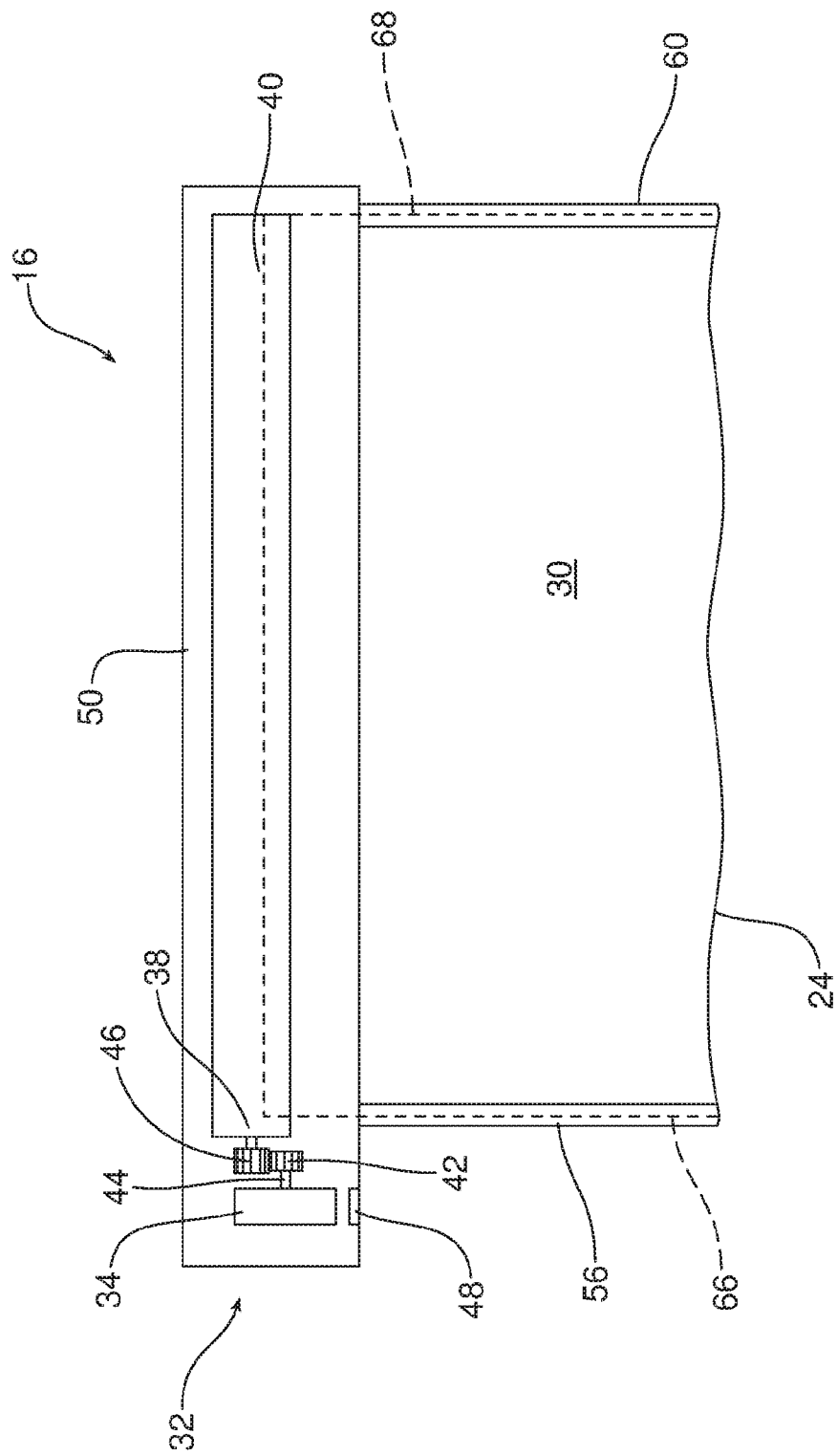
FIG. 5 is a detailed, schematic top plan view of the retractable floor assembly.

As illustrated in FIG. 5, the retractable floor assembly 16 may also include a drive mechanism generally designated by reference numeral 32. The drive mechanism 32 functions to displace the retractable floor 24 between the stowed position illustrated in FIGS. 1 and 6b and the deployed position illustrated in FIGS. 2 and 6a.

More specifically, the drive mechanism 32 includes a drive motor 34 and a linkage 36 connecting the drive motor to a proximal end 38 of the retractable floor 24. In the illustrated embodiment that linkage 36 includes (a) a roller 40 upon which the plurality of bars 26 of the retractable floor 24 are wound and (b) a gear drive 42 connecting the output shaft 44 of the drive motor 34 to the input gear 46 of the roller 40. An actuator 48, such as a push button, a toggle switch, a touchscreen display button or a voice activation system is connected to the drive motor 34 and allows one to selectively deploy or stow the retractable floor 24 as desired. As illustrated in FIG. 5, the cargo floor system 12 may also include a housing 50 for holding the drive mechanism 32, including the roller 40 upon which the retractable floor 24 and, more particularly, the plurality of bars 26, are wound when the retractable floor is in the fully deployed condition illustrated in FIGS. 2, 5 and 6a. When the retractable floor 24 is in the fully stowed condition (see FIGS. 1 and 6b), the access opening 20 is open allowing one to freely and easily access the recessed storage compartment 18 including, for example, a spare wheel and tire 52 that could be held therein.

Figure 2:
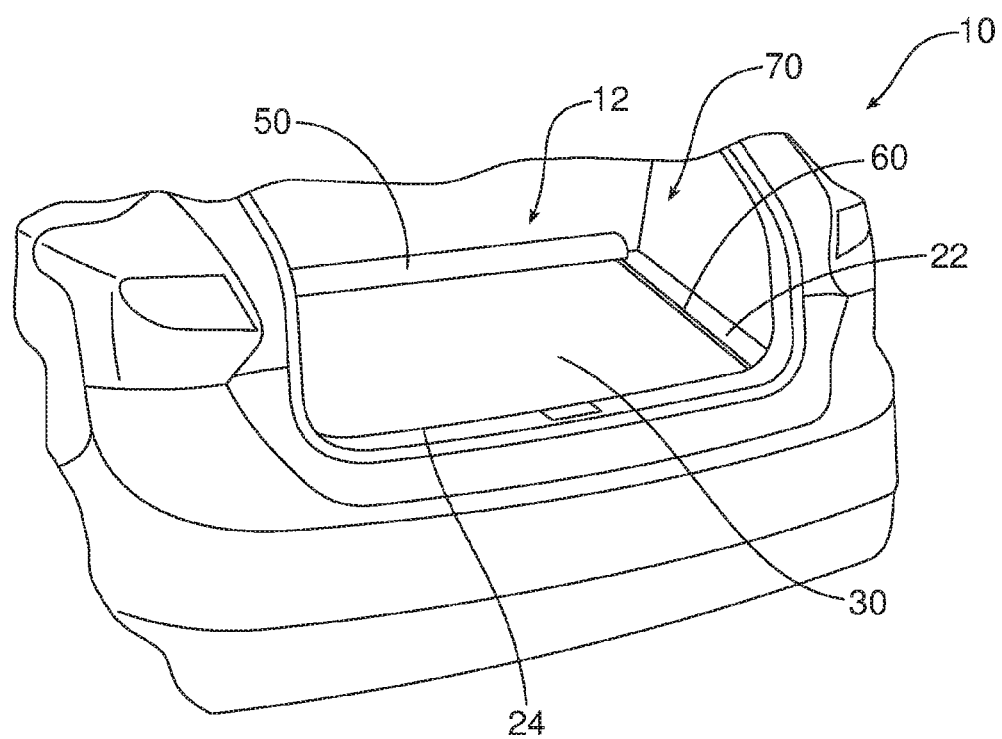
FIG. 2 is a view similar to FIG. 1 but illustrating the retractable floor assembly in the deployed position.
Figure 3:
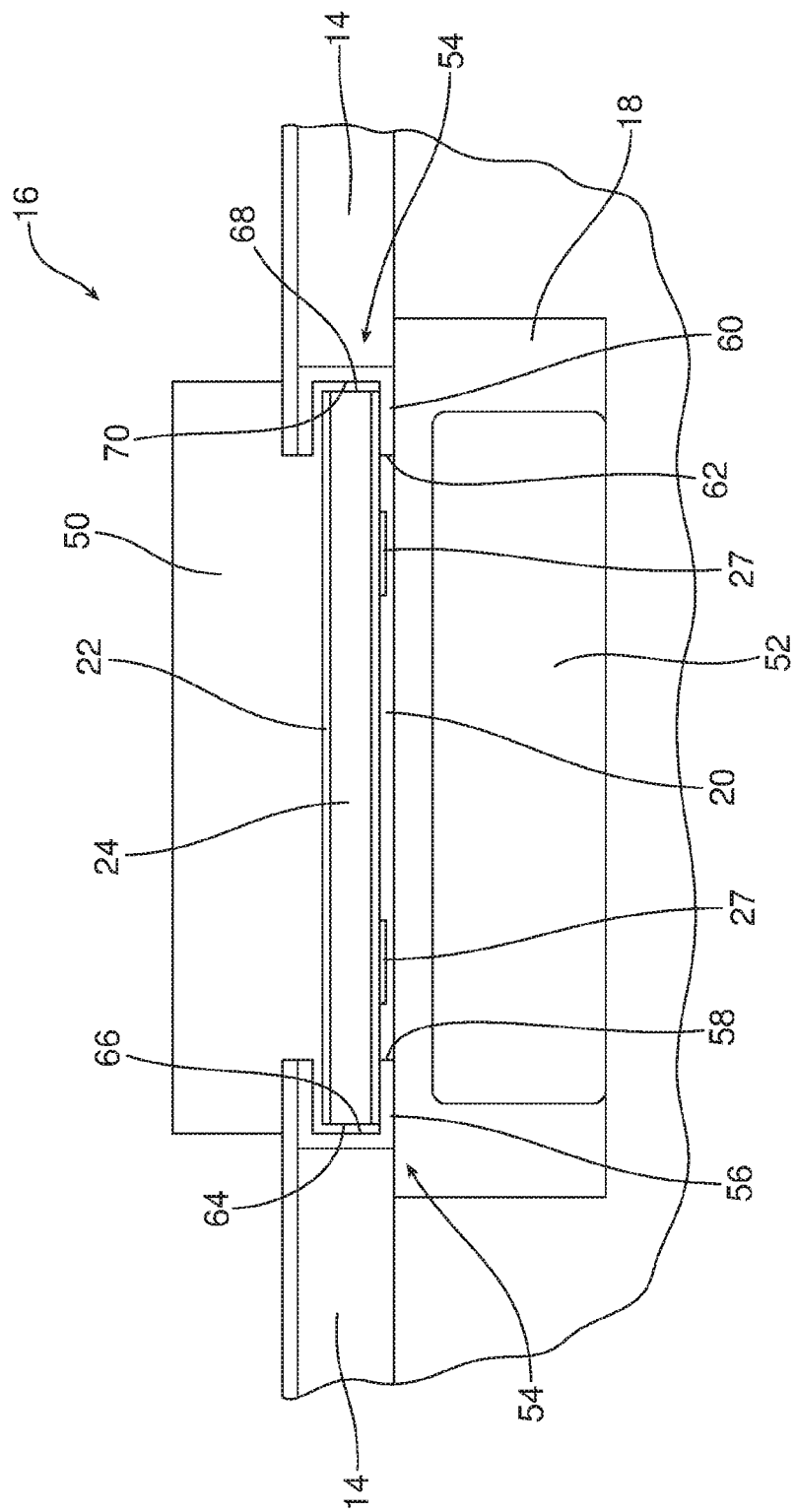
FIG. 3 is a schematic transverse cross-sectional view through the cargo floor system and the retractable floor assembly showing the retractable floor assembly spanning and closing the access opening to the recessed storage compartment holding the spare tire and wheel.
Figure 6A:
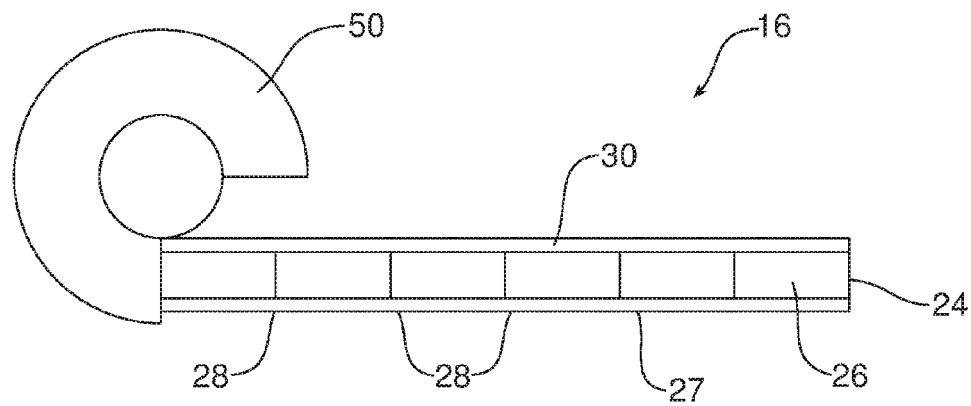
FIGS. 6a and 6b are schematic cross sectional views of the retractable floor assembly illustrating, respectively, the retractable floor of that assembly in a deployed position and a stowed position.

Most of the time, the retractable floor 24 will be maintained in the deployed position illustrated in FIGS. 2 and 6a. In the deployed position, the retractable floor 24 closes the access opening 20 and conceals the recessed storage compartment 18 including the spare wheel and tire 52.

A guide track 54 receives and supports the retractable floor 24 as the retractable floor is displaced between the stowed position and the deployed position. See FIG. 3. In the illustrated embodiment, the guide track 54 comprises a first guide rail 56 at a first side 58 of the access opening 20 and a second guide rail 60 at a second side 62 of the access opening 20. As further illustrated in FIG. 3, the retractable floor 24 includes a first end 64 that slides in the channel 66 in the first guide rail 56 and a second end 68 that slides in the channel 70 of the second guide rail 60.

In summary, the cargo floor system 12 provides a number of benefits and advantages. When the retractable floor 24 is in the deployed position illustrated in FIGS. 2 and 6a, the floor 24 closes the access opening 20, concealing the recessed storage compartment 18 as well as any objects found therein including, for example, the spare wheel and tire 52. Advantageously, the plurality of bars 26 and cooperating hinges 28 forming the retractable floor 24 form a strong structure capable of supporting luggage or other objects placed in the trunk T of the motor vehicle on the floor pan 14 and the retractable floor 24. The cargo floor system 12 also provides an aesthetically pleasing appearance since the floor pan 14, the retractable floor 24 and even the housing 50 may all be covered with matching decorative cover layers of carpeting or the like 22, 30, 72.

Figure 6B:
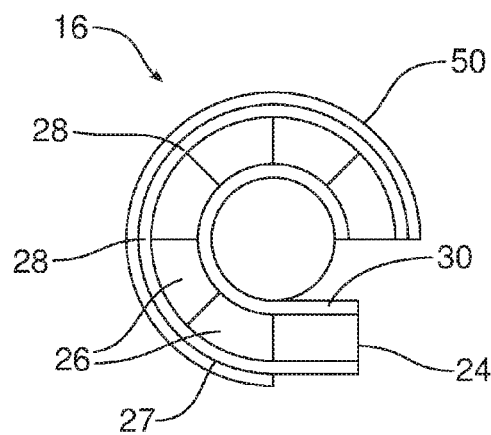

When one needs to access the recessed storage compartment 18 in order to, for example, reach the spare wheel and tire 52, one simply activates the actuator 48 which, in turn, causes the drive mechanism 32 to displace the retractable floor 24 from the deployed position illustrated in FIGS. 2 and 6a to the stowed position illustrated in FIGS. 1 and 6b. Thus, the plurality of bars 26 are wound onto the roller 40 and held within the housing 50. This winding of the plurality of bars 26 is accommodated by the two straps 27 which define the plurality of hinges 28. Once the retractable floor 24 is in the stowed position illustrated in FIGS. 1 and 6b, the access opening 20 is completely clear so as to allow one to remove the spare wheel and tire 52 from the recessed storage compartment 18. As should be appreciated, this may be accomplished without having to remove a floor liner from the trunk T of the motor vehicle as required by cargo floor systems known in the art. Many such prior art floor liners are bulky, unwieldy and difficult to handle. The cargo floor system 12 with the retractable floor assembly 16 advantageously eliminates this task.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A retractable floor assembly, comprising:
   a floor pan including a recessed storage compartment holding a spare tire and wheel;
   a guide track recessed within said floor pan and overlying said recessed storage compartment;
   a retractable floor adjacent to the floor pan, said retractable floor including a plurality of bars connected together by a plurality of hinges and adapted to slide along said guide track; and
   a drive mechanism displacing said retractable floor between a stowed position and a deployed position.

2. The retractable floor assembly of claim 1, wherein a decorative cover layer is carried on said plurality of bars.

3. The retractable floor assembly of claim 2, wherein said plurality of bars are made from bamboo and said decorative cover layer is a carpeting material.

4. The retractable floor assembly of claim 2, further including a housing holding said retractable floor when said retractable floor is in said stowed position.

5. The retractable floor assembly of claim 4, wherein said guide track includes a first guide rail and a second guide rail and said retractable floor includes a first end sliding on said first guide rail and a second end sliding on said second guide rail.

6. The retractable floor assembly of claim 5, wherein said drive mechanism includes a drive motor and a linkage connecting said drive motor to a proximal end of said retractable floor.

7. The retractable floor assembly of claim 6, wherein said linkage includes a roller upon which said retractable floor is wound.

8. A cargo floor system, comprising:
- a floor pan including a recessed storage compartment, an access opening in communication with said recessed storage compartment and a spare wheel and tire held in said recessed storage compartment;
- a retractable floor assembly including a retractable floor spanning said access opening and a drive mechanism displacing said retractable floor between a deployed position closing said access opening and a stowed position opening said access opening; and
- a guide track recessed within the floor pan overlying said recessed storage compartment, said guide track receiving and supporting said retractable floor.

9. The cargo floor system of claim 8, wherein said retractable floor includes a plurality of bars connected together by a plurality of hinges.

10. The cargo floor system of claim 9, wherein a decorative cover layer is carried on said plurality of bars.

11. The cargo floor system of claim 10, wherein said decorative cover layer is also provided on said floor pan.

12. The cargo floor system of claim 11, further including a housing holding said retractable floor when said retractable floor is in said stowed position.

13. The cargo floor system of claim 12, wherein said guide track includes a first guide rail at a first side of said access opening and a second guide rail at a second side of said access opening and said retractable floor includes a first end sliding in said first guide rail and a second end sliding in said second guide rail.

14. The cargo floor system of claim 13, wherein said drive mechanism includes a drive motor and a linkage connecting said drive motor to a proximal end of said retractable floor.

15. The cargo floor system of claim 14, wherein said linkage includes a roller upon which said retractable floor is wound.

16. The cargo floor system of claim 15, wherein said decorative cover layer is also provided on said housing.

17. The cargo floor system of claim 16, wherein said plurality of bars are made from bamboo and said decorative cover layer is a carpeting material.

* * * * *